(12) United States Patent
Spiegel et al.

(10) Patent No.: US 11,058,126 B2
(45) Date of Patent: Jul. 13, 2021

(54) METHOD FOR THE MANUFACTURE OF A CREAM CHEESE

(71) Applicant: KRAFT FOODS R&D, INC., Deerfield, IL (US)

(72) Inventors: Thomas Spiegel, Munich (DE); Alan Wolfschoon-Pombo, Munich (DE)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 65 days.

(21) Appl. No.: 16/334,868

(22) PCT Filed: Oct. 5, 2017

(86) PCT No.: PCT/IB2017/001332
§ 371 (c)(1),
(2) Date: Mar. 20, 2019

(87) PCT Pub. No.: WO2018/122595
PCT Pub. Date: Jul. 5, 2018

(65) Prior Publication Data
US 2019/0261639 A1 Aug. 29, 2019

(30) Foreign Application Priority Data

Oct. 13, 2016 (GB) ...................... 1617372

(51) Int. Cl.
| | | |
|---|---|---|
| *A23C 19/076* | (2006.01) | |
| *A23C 9/142* | (2006.01) | |
| *A23C 19/028* | (2006.01) | |
| *A23C 9/00* | (2006.01) | |
| *A23C 19/00* | (2006.01) | |
| *A23C 19/032* | (2006.01) | |
| *A23C 19/05* | (2006.01) | |

(52) U.S. Cl.
CPC .............. *A23C 19/076* (2013.01); *A23C 9/00* (2013.01); *A23C 9/1422* (2013.01); *A23C 19/00* (2013.01); *A23C 19/028* (2013.01); *A23C 19/032* (2013.01); *A23C 19/052* (2013.01)

(58) Field of Classification Search
CPC ....... A23C 19/076; A23C 9/00; A23C 9/1422; A23C 19/00; A23C 19/028; A23C 19/032; A23C 19/052

USPC ..... 426/34, 36, 38, 39, 40, 42, 43, 580, 582
See application file for complete search history.

(56) References Cited

U.S. PATENT DOCUMENTS

| | | |
|---|---|---|
| 6,406,736 B1 | 6/2002 | Han |
| 7,323,204 B2 * | 1/2008 | Zheng ................ A23C 19/0684 426/34 |
| 7,674,489 B2 | 3/2010 | Moran et al. |
| 8,349,379 B2 | 1/2013 | Wolfschoon-Pombo et al. |
| 2009/0047386 A1 | 2/2009 | Sweley et al. |
| 2016/0157504 A1 * | 6/2016 | Carrington-Bataller ..................... A23C 19/076 426/582 |

FOREIGN PATENT DOCUMENTS

| | | |
|---|---|---|
| EP | 1769687 A1 | 4/2007 |
| EP | 2269466 A2 | 1/2011 |
| EP | 2647293 A1 | 10/2013 |
| FO | 2006057968 A1 | 6/2006 |
| JP | 2004105048 A | 4/2004 |
| WO | 02080691 A1 | 10/2002 |
| WO | 2016121901 A1 | 8/2016 |

OTHER PUBLICATIONS

Database WPI; Week 201047; Thomson Scientific, London, GB; AN 2010-G98699, XP002777094, & CN 101 715 836 A (Univ Tianjin Sci & Technology) Jun. 2, 2010 (Jun. 2, 2010) abstract.
International Search Report issued for International Application No. PCT/IB2017/001332, International Filing Date Oct. 5, 2017, dated Jul. 5, 2018, 3 pages.
Written Opinion issued for International Application No. PCT/IB2017/001332, International Filing Date dated Jul. 5, 2018, 6 pages.

* cited by examiner

*Primary Examiner* — Leslie A Wong
(74) *Attorney, Agent, or Firm* — Cantor Colburn LLP

(57) ABSTRACT

The present invention relates to a method for the manufacture of a cream cheese, the method comprising:
(i) providing a first dairy liquid;
(ii) fermenting the first dairy liquid to form a first acidified dairy liquid;
(iii) providing a second dairy liquid;
(iv) acidifying the second dairy liquid with citric acid to form a second acidified dairy liquid;
(v) combining the first acidified dairy liquid and the second acidified dairy liquid to form a cream cheese.

19 Claims, 5 Drawing Sheets

METHOD FOR THE MANUFACTURE OF A CREAM CHEESE

CROSS-REFERENCE TO RELATED APPLICATIONS

This Application is a U.S. National Stage Application of PCT/IB2017/001332, filed Oct. 5, 2017, which claims the benefit of GB 1617372.6 filed Oct. 13, 2016, both of which are incorporated by reference in their entirety.

The present disclosure relates to a method for the production of a cream cheese. In particular, the disclosure relates to a method in which a separate fat-rich stream and a separate protein-rich stream are independently acidified before being combined in order to improve the properties of the resulting cream cheese.

Cream cheese is an acidic, uncured cheese made of dairy components including a fat source, preferably a mixture of cream and milk. Typically, in making cream cheese, a dairy food base (such as milk) is mixed with a fat source (such as cream) followed by a pasteurization step. Before or after the pasteurization step, the cream cheese mix may be homogenized. After these steps, the mix is acidified.

Typically, the mix is indirectly acidified by fermentation, which can be initiated by adding a bacterial culture (such as a lactic acid producing culture) to inoculate the mix. The fermentation step can typically take place for at least about 10 hours and, in particular, about 1 to 2 days. Suitable cultures may comprise a lactic starter culture, selected from among mesophilic and thermophilic lactic-acid-producing bacteria, for instance. Typically, the fermentation process yields a final product that is preferable to consumers because of its "culture notes". Culture notes refer to the flavours and/or aromas associated with a fermented cream cheese product. An example of the manufacture of such cream cheeses is set out in EP2269466.

During the acidification process, the milk becomes acidified to a point where the casein in the milk coagulates and forms a gel. This coagulation produces curds, which eventually become the cream cheese, and acid whey, which is the liquid portion that contains water, lactose, whey proteins and salt/minerals. The curds and whey are not necessarily individually discernible at this point. Indeed, the coagulation typically produces a gelled sour mix, which is made up of curds and whey.

A separation step may be employed to remove at least some of the water phase, with all its soluble components, from the gelled sour mix. In some cases, the curds are at least partially separated from the acid whey. This is the case where the separation step involves a centrifugation process. By contrast, where a membrane filtration step is employed to remove moisture, this does not necessarily involve removal of whey proteins. The distinction lies in the fact that centrifugation separates components in accordance with their density, whereas membrane filtration separates in accordance with molecular size. When using these types of separation process, a loss of flavour can occur upon the removal of the acidic phase from the curd phase. After the separation step, the mixture may be homogenized, resulting in the final cream cheese product.

The concentration step after acidification in the conventional cream cheese processes result in the formation of large volumes of acid whey. Acid whey is formed when the pH of a dairy liquid is reduced causing it to coagulate or curdle. This separates the dairy liquid into milk solids, known as curds, and the liquid whey. Whey can be 'acid' or 'sweet' depending on the process used to make it and the pH of the whey produced. An acid whey may be defined as a whey with a pH below about 5.1 to 5.6.

When cream cheese is produced on an industrial scale the quantities of acid whey produced represent an environmental (disposal) and processing issue. In order to address this various methods have been developed in order to avoid the need for separation and removal of acid whey.

Additionally, whey proteins have been found to have a high nutritive value. Accordingly there is a desire to develop cream cheese production methods which maintain the whey proteins in the final product.

Pre-concentration of milk protein at neutral pH could enable a process without acid whey production. However, fermentation of milk protein concentrate with traditional (mesophilic) cultures yields an acidic, mineralic and bitter taste reducing consumer desire for the product.

US 20090047386 discloses a process for manufacturing a cream cheese product without the need for a whey separation step. The process involves fermenting a first low protein mixture of dairy ingredients then adding a second mixture of dairy ingredients containing a larger amount of dairy protein. The mixture is heat treated to produce a cream cheese.

As an alternative to fermentation, the concentrated dairy liquid may be directly acidified, for example by adding lemon juice, vinegar or a food grade additive such as lactic acid or citric acid. Examples of a direct acidification processes for producing cream cheese are set out in U.S. Pat. No. 6,406,736 and WO2006057968. However, the cream cheese products of U.S. Pat. No. 6,406,736 and WO2006057968 lack the desirable culture flavour notes produced by the fermentation process.

Another approach to avoiding the generation of unpleasant, bitter, mineralic tastes is to use Calcium-depleted concentrates. Examples of such processes may be found in EP2647293A1 and WO02080691A1. However, the use of Calcium-depleted concentrates to produce cream cheese inevitably leads to a cheese with a depleted nutritional content, thereby reducing consumer appeal for the product.

There is a desire for an improved method for the manufacture of cream cheese, or at least a method that will mitigate some of the problems associated with the prior art or provide a useful alternative thereto. In particular, there is a desire for a method of manufacture of cream cheese that does not require a whey separation step whilst maintaining the desired culture flavour notes and avoiding an acidic, mineralic bitter taste. Moreover, there is a desire for a cream cheese which has a good nutritional content including whey proteins and calcium.

According to a first aspect, the present disclosure provides a method for the manufacture of a cream cheese, the method comprising:
(i) providing a first dairy liquid;
(ii) fermenting the first dairy liquid to form a first acidified dairy liquid;
(iii) providing a second dairy liquid;
(iv) acidifying the second dairy liquid with citric acid to form a second acidified dairy liquid;
(v) combining the first acidified dairy liquid and the second acidified dairy liquid to form a cream cheese.

As discussed below, the method provides a nutritionally improved, good tasting cream cheese, with high levels of calcium. Surprisingly, the method permits these high levels without the expected bitter off-taste. In addition, the method is wheyless, thereby avoiding the production of an acid whey by-product.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The present disclosure relates to a method for the manufacture of a cream cheese. Cream cheese is a well-known foodstuff. It is a soft, mild-tasting cheese, often with a high fat content. Traditionally, it is made from whole milk enriched with additional cream. Cream cheese is not naturally matured and is meant to be consumed fresh. Cream cheese is often spread on bread, bagels, crackers, etc., and used as a dip for potato chips and similar snack items, and in salads.

The method of the present disclosure involves a number of steps. As will be appreciated, while these steps may be performed sequentially, they may alternatively be performed concurrently or with overlap between the steps when the process is carried out in a continuous manner.

The method of the present disclosure involves the use of dairy liquids. A dairy liquid is a liquid obtained from the milk of mammals, typically cows, sheep, goats and the like. Cow's milk is the most prevalent. Dairy liquids typically comprise whey protein, casein, minerals and/or lactose, together with any fat fraction. As such, the definition includes dairy derivatives such as milk protein concentrate, total milk protein concentrate, whey protein concentrate, casein and the like as long as they are in liquid form.

The first and second dairy liquids are in liquid forms such as solutions and suspensions. These aqueous liquids are important to allow good homogeneous mixing of the liquids and for continuous processing. The dairy liquids may be formed by reconstitution of powder ingredients with water. The second dairy liquid, for example, may be a reconstituted milk protein powder.

Preferred examples of dairy liquids include whole milk, skimmed milk, cream (single, double), whipping cream, and the like which have well known industry definitions. Whole milk contains at least 3 wt. % fat. Cream contains at least 10 wt. % fat, and preferably between 30 wt. % and 50 wt. % fat. The remaining portion of the milk, once the high-butterfat phase has been removed, is referred to as skimmed milk. The fat content of skimmed milk is normally less than 0.3 wt. %. The dairy liquids may optionally be concentrated before use, such as by ultrafiltration or evaporation.

Preferably the dairy liquids are pasteurized and/or homogenized before use, particularly where the dairy liquid is a directly obtained liquid such as milk or cream, rather than a milk protein concentrate. Pasteurization and homogenization may be performed in any order. The use of a homogenized dairy liquid aids processing as a more uniform dairy liquid requires less adjustment of process variables. Homogenisation and pasteurisation processes are well known in the art.

The first step is the provision of a first dairy liquid. The first dairy liquid is preferably a fat-rich dairy liquid, such as cream. Preferably the first dairy liquid comprises at least 30% fat, more preferably the first dairy liquid comprises from 30% to 50% fat, preferably from 35 to 45% fat and may also contain about 2% protein. Preferably the first dairy liquid comprises cream. Preferably the first dairy liquid consists of cream. Cream is a dairy product composed of the higher-butterfat layer skimmed from the top of milk before homogenization. In un-homogenized milk, the fat, which is less dense, will eventually rise to the top. In the industrial production of cream, this process is accelerated by using centrifuges called "separators". In many countries, cream is sold in several grades depending on the total butterfat content. Cream can be dried to a powder for shipment to distant markets. In addition to cream, other sources of milk fat like butter, concentrated milk fat or anhydrous milk fat can be used to adjust the fat content in the first dairy liquid. Accordingly, the first dairy liquid has a relatively high fat to protein ratio and may be considered as the primary fat source.

Preferably the first dairy liquid is pasteurized and/or homogenized prior to fermentation. The use of a pasteurized first dairy liquid may remove the need for a further pasteurisation step whilst still producing a pasteurized shelf stable product.

The method involves fermenting the first dairy liquid to form a first acidified dairy liquid. Fermentation, in the context of this application, preferably refers to lactic acid fermentation, a biological process by which glucose and other six-carbon sugars, and disaccharides such as sucrose or lactose which are first split into six-carbon sugars, are converted into cellular energy and the metabolite lactic acid. Lactose is split into glucose and galactose during the process and then converted into cellular energy and the metabolite lactic acid. It is an anaerobic fermentation reaction that occurs with lactic acid-producing bacteria. These bacteria may be mesophilic, that is to say, they grow best at moderate temperatures, typically between 15 and 30° C. Alternatively, these bacteria may be thermophilic, that is to say, they grow best at relatively high temperatures, between 35 and 55° C. The most widely used genera of lactic acid-producing bacteria are *Lactococcus, Leuconostoc, Streptococcus* and *Lactobacillus*. Suitable strains of lactic acid-producing bacteria are commercially available.

Preferably the first dairy liquid is fermented with mesophilic lactic acid producing bacteria. Preferably the fermentation comprises the use of citrate positive bacteria. Bacteria metabolising citrate produce the desirable flavour notes associated with traditional cream cheeses. That is, citrate is a pre-cursor for desirable aroma compounds, e.g. diacetyl.

Bacteria may be grouped based on whether or not they are able to metabolize citrate. The citrate may be metabolised either as the sole source of carbon and energy, or as a source of carbon in the presence of a fermentable sugar such as lactose as the energy source. Those bacteria that are able to grow on a medium with citrate alone, or citrate and a fermentable sugar, are classified as citrate positive, provided the citrate is also consumed; those which do not, are classified as citrate negative. As will be appreciated, such bacteria may, of course, be able to grow on other carbon sources as well.

Preferably the step of fermenting the first dairy liquid to form an acidified first dairy liquid is carried out for a period of least about 6 hours, preferably from about 12 to 36 hours. Preferably, after fermentation, the first acidified dairy liquid has a pH less than 5.5, more preferably from 3.75 to 5.3, more preferably less than 5.2, most preferably from 4.0 to 5.0. Generally, the lower the temperature of the fermentation step, the longer the required fermentation time. For example, the fermentation step may be carried out for 15-30 hours at 18-25° C. to reach the required pH. The fermentation discussed herein is carried out in a conventional fermentation tank.

A further step is the provision of a second dairy liquid. The second dairy liquid is preferably a protein-rich dairy liquid, such as a milk concentrate. Preferably the second dairy liquid consists of a milk concentrate. Preferably the second dairy liquid comprises at least 6 wt. % protein, more preferably between 6 wt. % and 18 wt. % protein. Preferably the second dairy liquid comprises microfiltered or ultrafiltered milk concentrate, preferably obtained at a temperature of from 5 to 60° C. Preferably the second dairy liquid is derived from skim milk, such as a skim milk UF- or MF-concentrate. The total fat content of such a concentrate will typically be <1%. The concentrate may be obtained by reconstituting milk protein powders. The concentrate may be fortified with the addition of up to 30 wt % whey protein. Accordingly, the second dairy liquid has a relatively low fat to protein ratio, and may be considered as the primary protein source.

The method involves acidification of the second dairy liquid by the addition of citric acid. The acidification of the second dairy liquid may comprise the addition of lemon juice, or lemon juice concentrate. Preferably citric acid is added to the second dairy liquid in the form of a 50% citric acid solution for ease of mixing. Acidification of the second dairy liquid by the direct addition of citric acid provides a desirable, balanced, mildly acidic flavour. Without wishing to be bound by theory, it is believed that the presence of citrate leads to the formation of a calcium citrate complex/ion pair. This is reflected by a reduced soluble calcium content in the product. When using analytical tests to determine the level of soluble calcium content by ultracentrifugation, the citrate seems to reduce the soluble calcium content in the supernatant.

Optionally, the step of acidifying the second dairy liquid further comprises fermenting the second dairy liquid either before or after the acidification with citric acid. Fermenting the acidified second dairy liquid may supplement the desirably culture flavour notes, improving the flavour and overall consumer appeal of the cream cheese product. The inventors have found that if the second dairy liquid is fermented after acidification with citric acid it is important that the fermentation uses citrate negative bacteria.

The inventors have surprisingly found that, fermenting the second dairy liquid before acidification with citric acid or after acidification with citric acid using citrate negative bacteria may supplement the culture flavour notes, without leading to unpleasant mineralic bitter flavours normally associated with acidification of similar dairy liquids.

If using a thermophilic bacteria, the step of fermenting the second acidified dairy liquid is preferably carried out for a period of least about 2 to about 12 hours, at a temperature of from 35 to 45° C. If using a mesophilic bacteria, the step of fermenting the second acidified dairy liquid is preferably carried out for a period of least about 15 to about 30 hours, at a temperature of from 15 to 30° C.

Preferably, after acidification, the second acidified dairy liquid has a pH of less than 5.3, preferably a pH of between 4.5 and 5.0. That is, the amount of citric acid added (and optional fermentation) are sufficient to reduce the pH values to these levels.

Preferably, the second dairy liquid is pre-acidified with citric acid to a pH of 5.5-6.0 first, and then fermented with thermophilic or mesophilic bacteria to a pH of less than 5.3, preferably a pH of between 4.5 and 5.0.

Preferably the second dairy liquid is produced by a method comprising:
(a) providing a third dairy liquid comprising milk;
(b) pasteurizing the third dairy liquid;
(c) ultrafiltrating or microfiltrating the pasteurized third dairy liquid; and optionally
(d) heat-treating the filtered pasteurized third dairy liquid, preferably wherein the third dairy liquid comprises skimmed milk. Preferably, the total fat content of the second dairy liquid is less than 1%.

Alternatively, the second dairy liquid may be produced by rehydrating a milk or dairy powder, such as a whole or skimmed milk powder, a whey protein concentrate, milk protein concentrate, or micellar casein powder. Preferably wherein the second dairy liquid comprises 20-30 wt. % whey protein by weight of the total protein content of the second dairy liquid. Independent of how the second dairy liquid is produced it may be supplemented by the addition of protein containing powders. Suitable protein containing powders are micellar casein powder, whey protein concentrate, and milk protein concentrate.

Optionally, the protein stream can be treated with coagulating or cross-linking enzymes, e.g. rennet or transglutaminase. This can help to adjust the final texture of the product.

The method further comprises mixing the first and second acidified dairy liquids together. Both the first and second acidified dairy liquids are significant components of the acidified mixture. That is, each generally forms at least 20 wt % of the final mixture. The relative amounts of the first and second acidified dairy liquid combined to form the acidified mixture depends both on their respective fat and protein content, as well as the specific type of cream cheese being produced. For a full fat cream cheese a larger proportion of the first dairy liquid will be included than for a light cream cheese, assuming the same or similar first and second dairy liquids are used. Alternatively, a smaller proportion of a 50% fat first dairy liquid would be used than a 20% fat dairy liquid to produce the same type of cream cheese. The skilled person working the method disclosed herein would readily select first and second dairy liquids and adjust the relative amounts in order to arrive at a desired cream cheese product using the method.

Preferably the ratio of the first acidified dairy liquid to the second acidified dairy liquid in the acidified mixture is from 1:4 to 4:1, more preferably from 1:3 to 3:1, most preferably from 1:2 to 2:1. That is, each of the acidified dairy liquid constitutes at least 20% of the total acidified mixture.

The inventors have found that by varying the ratios of the first and second acidified dairy liquids and their respective absolute fat and protein contents it is possible to produce "full-fat" or "light" cream cheese with desirable nutritional content, without undesirable acidic, mineralic or bitter flavours whilst maintaining the culture notes and mildly acidic tang of traditional cream cheese.

If necessary, the final pH of the mixture may be adjusted to obtain the desired level of acidity. For example, an increase in pH may be achieved by adding a small portion of non-fermented cream or non-acidified protein-rich dairy liquid. A decrease in pH may be achieved by additional dosing of citric acid to the mixture. The final pH-adjustment of the mixture may be performed prior or after any optional heating or homogenizing steps.

The combination of the first and second acidified dairy liquids, which may be considered an acidified mixture, can then be used directly as a cream cheese. Depending on the type and form of the cream cheese desired, no further steps may be required to form the cream cheese, but typically a pasteurizing step, to inactivate lactic cultures and extend shelf-life, and/or a texturising step (shear and heat treatment) to increase the firmness of the final product are performed. Such steps are well known in the art.

Preferably the method further includes a step of heat-treating and/or homogenizing and/or texturising the acidified mixture. Preferably the step of texturizing the acidified mixture is carried out for a period of 10-80 minutes, preferably 15-70 minutes, more preferably from 30-60 minutes and most preferably from 40-50 minutes. Preferably the step of texturizing the acidified mixture is carried out at a temperature of 70-90° C., preferably 73-80° C., more preferably 75-80° C. and more preferably about 78° C.

The acidified mixture substantially comprises the first and second acidified dairy liquids, optionally with relatively small amounts of optional ingredients included. The optional ingredients preferably include other dairy components, such as whey protein concentrates and lactose concentrates, other protein sources, lactose, salt, locust bean gum, carrageenan, gelatine, citrate, stabilizers, colours and flavours.

Preferably the acidified mixture substantially comprises dairy-based ingredients, including the first and second acidified dairy liquids, such that the dairy-based content is at least 90 wt % of the acidified mixture, preferably at least 95 wt %, more preferably at least 99 wt %. Preferably the first and second dairy liquids provide at least 80 wt % of the acidified mixture, preferably at least 90 wt %, more preferably at least 95 wt %.

Preferably step (iii) and or step (v) further comprises adding one or more of the optional ingredients discussed above, more preferably one or more of protein concentrates, lactose, salt, citrate, stabilizers, and flavours. The addition of salt is particularly preferred (NaCl). The amount of salt added will typically be from 0.1 to 1.5 wt % by weight of the final product.

Preferably the salt is added to the second dairy liquid during step (iii). The inventors have surprisingly found that addition of salt prior to acidification may reduce the viscosity of the dairy liquid. High viscosity in the dairy liquid streams presents processing difficulties using conventional equipment. In particular, when producing cream cheese from concentrated dairy liquids in order to avoid acid whey separation, viscosity of the intermediates is already higher than in conventional cream cheese production methods. Accordingly, reducing the viscosity improves processability.

The process disclosed herein is a wheyless process, so no acid whey by-product is produced. Accordingly, preferably the method disclosed herein does not involve a step of removing an acid whey or acid permeate.

In a further aspect, the present disclosure provides a cream cheese produced according to the method disclosed herein. The cream cheese is preferably packaged for sale in suitable containers and may, optionally, be blended or swirled with other ingredients (such as herb mixes—referred to as flavouring preparations) for specific product lines. Such further ingredients may form up to 20% and typically about 15 wt % of the product.

The inventors have found that advantageously the cream cheese produced by the method disclosed herein has a high total calcium content, but have surprisingly found that the proportion of the calcium which is soluble is lower than would be expected. The cream cheese produced by the method disclosed herein generally has at least 50% more calcium than that of conventional commercially produced cream cheese. The cream cheese of the present application typically has less than 50 wt % soluble calcium as a percentage of a total calcium content, preferably less than 40 wt %, more preferably less than 35 wt %.

The total calcium content of the cream cheese may be measured by atomic absorption spectroscopy or titration with EDTA (complexometric). The cream cheese made by method disclosed herein preferably contains at least 1600 mg of calcium per kg of product, more preferably at least 2000 mg/kg.

The soluble calcium content of the cream cheese may be measured by separation of the aqueous phase by ultracentrifugation at 65,000 g for 2 hours at 20° C. The cream cheese made by method disclosed herein preferably contains less than 1000 mg of soluble calcium per kg of product, more preferably less than 750 mg/kg.

It is known to fortify cream cheese with calcium. However, the bioavailability of added calcium is much lower than that of naturally present calcium. The inventors have found that the method disclosed herein provides a cream cheese with higher calcium content than conventional commercially produced cream cheese without any added calcium. The cream cheese made by the method disclosed herein preferably does not include any added calcium. That is, the cream cheese made by the method disclosed herein has a desirable high calcium content and all the calcium present is bioavailable and derived primarily from the first and second dairy liquids.

Accordingly, the method of the present disclosure may provide a cream cheese having a high calcium content without any added calcium. Additionally, since the method disclosed herein does not involve a whey separation step the cream cheese has a significant whey protein component. Advantageously, the beneficial nutritional content of the calcium and whey protein improves consumer desire for the product.

Additionally, the method disclosed herein avoids the generation of the unpleasant acidic, mineralic, and bitter flavours found in other cream cheese products, particularly those produced without a whey separation step.

Without wishing to be bound by theory, it is believed that direct acidification of the second dairy liquid with citric acid reduces the levels of free calcium in the cream cheese without reducing the total calcium content due to the maintenance/stabilisation and/or formation of calcium citrate complex. Accordingly, a high calcium content is maintained in the product without the production undesirable mineralic, bitter flavours.

In summary, the present inventors have found that the method disclosed herein and the cream cheese produced by the method is associated with a number of specific advantages.

A) The process is a wheyless process, so no acid whey by-product is produced.
B) The product is rich in calcium compared to known cream cheese products. Indeed, the product typically has at least 50% more calcium than other, non-calcium-fortified, cream cheeses.
C) The method appears to result in the calcium being provided partially in a non-soluble but bioavailable form. This has a good nutritional benefit.
D) The high levels of calcium are not associated with a bitter off-flavour. Without wishing to be bound by theory, this may be because of the non-soluble form of the calcium.

FIGURES

The present disclosure will now be described in relation to the following non-limiting figures, in which.

Figure 1:
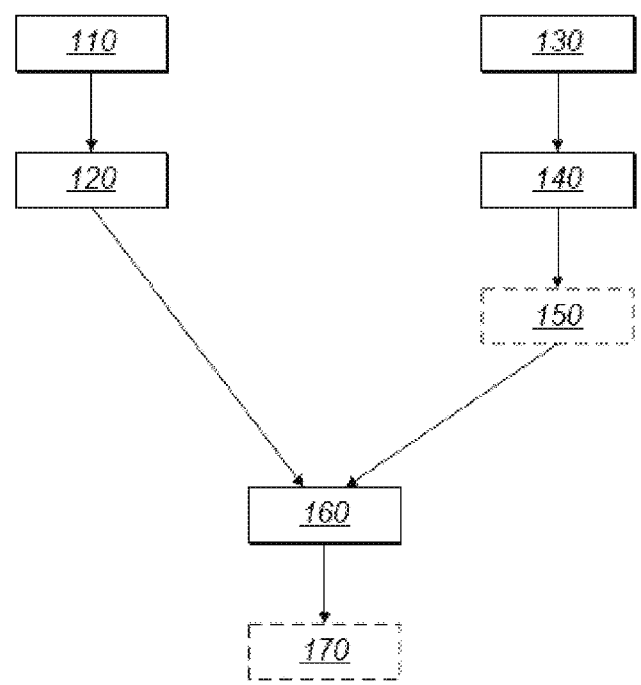
FIG. 1 is a flow chart of the steps in accordance with the method of manufacturing cream cheese of the present disclosure.

FIG. 1 shows:
step 110 of providing a first dairy liquid;
step 120 of fermenting the first dairy liquid;
step 130 of providing a second dairy liquid;
step 140 of directly acidifying the second dairy liquid with citric acid;
optional step 150 of fermenting the acidified second dairy liquid;
step 160 of combining the acidified dairy liquids; and
optional step 170 of heat treating the acidified mixture.

For consistency like reference numerals in figure to relate to the equivalent step in FIG. 1.

Figure 2:
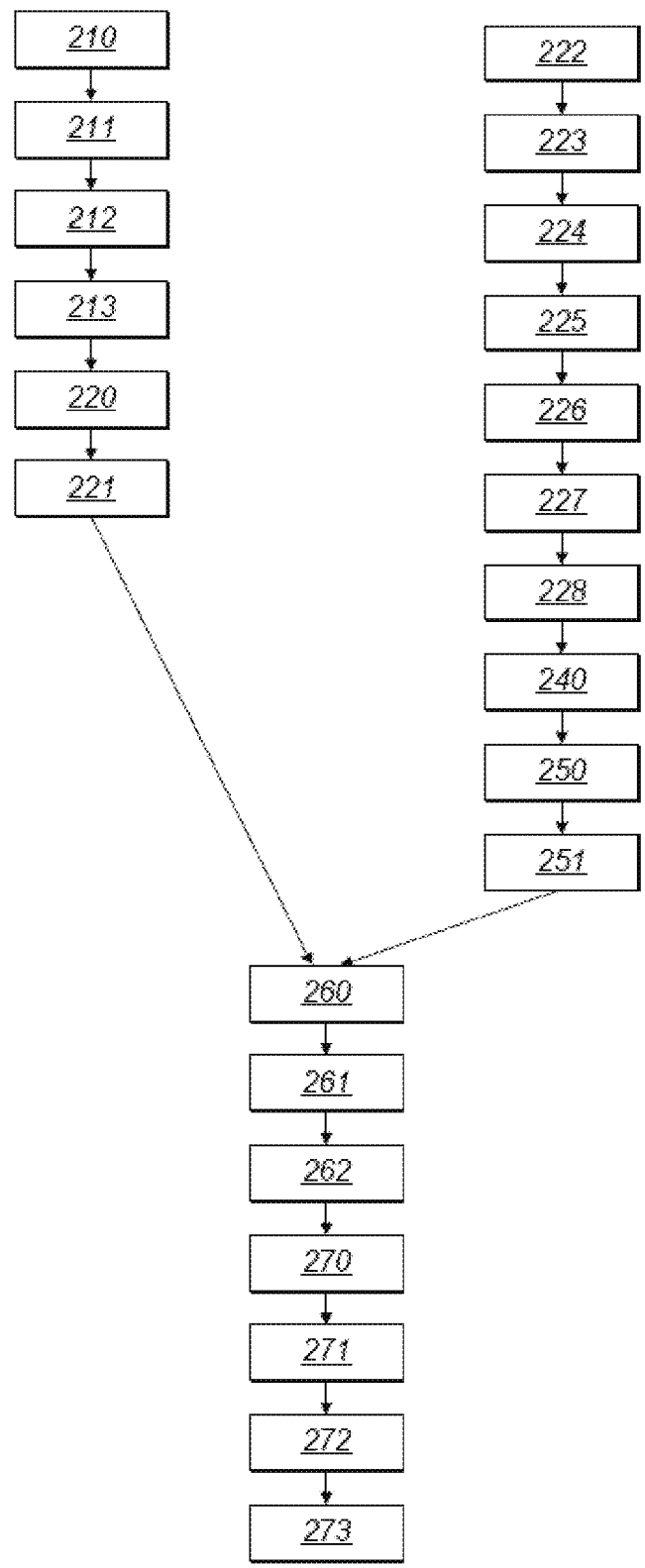
FIG. 2 is a flow chart of the steps of an alternative process also in accordance with the method of manufacturing cream cheese of the present disclosure.

FIG. 2 shows:
step 210 of providing the first dairy liquid;
step 211 of pasteurizing the first dairy liquid;
step 212 of homogenising the pasteurized first dairy liquid;
step 213 of cooling the homogenized first dairy liquid;
step 220 of fermenting the cooled homogenized first dairy liquid;
step 221 of cooling fermented first dairy liquid to produce a first acidified dairy liquid;
step 222 of providing a milk;
step 223 of pasteurizing the milk;
step 224 of cooling the pasteurized milk;
step 225 of filtering the cooled pasteurised milk;
step 226 and 227 of heating and cooling the cooled pasteurized milk to provide a second dairy liquid;
step 228 of enzyme treating the second dairy liquid;
step 240 of acidifying the second dairy liquid with citric acid;
step 250 of fermenting the second acidified dairy liquid;
step 251 of cooling the fermented second acidified dairy liquid;
step 260 of combining the first acidified dairy liquid and the cooled fermented second acidified dairy liquid to produce an acidified mixture;
step 261 of holding the acidified mixture at a temperature;
step 262 of adding further ingredients to the acidified mixture;
step 270 of heat-treating the acidified mixture;
step 271 of homogenizing the heat-treated acidified mixture;
step 272 of texturizing the heat-treated mixture; and
step 273 of cooling the texturised mixture to produce a cream cheese.

The order of steps 211 and 212 may optionally be reversed. Additionally, steps 270, 271 and 272 may be performed in any order, though 272 is generally the last of these steps.

Figure 3:
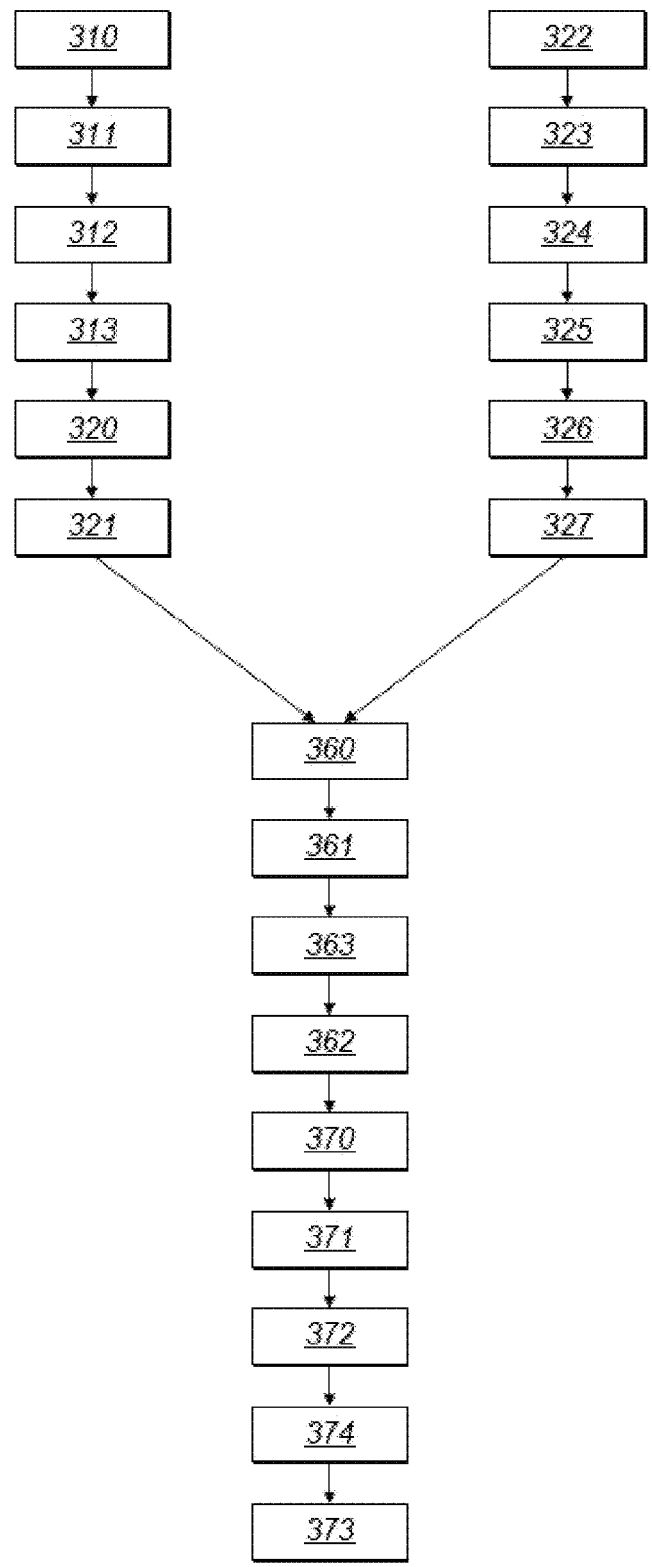
FIG. 3 is a flow chart of the steps of an alternative process for the manufacture of cream cheese.

FIG. 3 is a flow chart of the steps of an alternative process. All aspects and preferred features of the processes described herein apply equally to this alternative process.

FIG. 3 shows:
step 310 of providing the first dairy liquid;
step 311 of pasteurizing the first dairy liquid;
step 312 of homogenising the pasteurized first dairy liquid;
step 313 of cooling the homogenized first dairy liquid;
step 320 of fermenting the cooled homogenized first dairy liquid;
step 321 of cooling fermented first dairy liquid to produce a first acidified dairy liquid;
step 322 of providing a milk;
step 323 of pasteurizing the milk;
step 324 of cooling the pasteurized milk;
step 325 of filtering the cooled pasteurised milk;
step 326 and 327 of heating and cooling the cooled pasteurized milk to provide a second dairy liquid;
step 360 of combining the first acidified dairy liquid and the second dairy liquid to provide a partially acidified mixture;
optional step 361 of holding the acidified mixture at a temperature;
optional step 363 of further acidifying the partially acidified mixture with citric acid;
step 362 of adding further ingredients to the acidified mixture;
step 370 of heat-treating the acidified mixture;
step 371 of homogenizing the heat-treated acidified mixture;
optional step 374 of further acidifying the partially acidified mixture with citric acid
step 372 of texturizing the heat-treated mixture; and
step 373 of cooling the texturised mixture to produce a cream cheese.

At least one of optional steps 363 and 374 must occur, preferably both.

The order of steps 311 and 312 may optionally be reversed. Additionally, steps 370, 371 and 373 may be performed in any order, though 373 is generally the last of these steps.

This alternative process for the manufacture of a cream cheese comprises:
(i) providing a first dairy liquid;
(ii) fermenting the first dairy liquid to form a first acidified dairy liquid;
(iii) providing a second dairy liquid;
(iv) combining the first acidified dairy liquid and the second dairy liquid to form a partially acidified mixture; and
(v) further acidifying the partially acidified mixture with citric acid to form a cream cheese.

FIG. 3 shows a specific example of this alternative process, wherein the second dairy liquid is formed from a milk by pasteurizing, filtering and heat-treating a milk. However, the skilled person would readily appreciate that the variations to the method of the invention disclosed herein may also be applied to this alternative process. In this process the two streams are initially treated separately, the fat stream is fermented before the streams are combined. The combined mixture is then further directly acidified by the addition of citric acid.

The present disclosure will now be described in relation to the following non-limiting examples.

Comparative Example 1

Cream cheese bases were produced from cream (30% fat), skim milk, WPC70 (whey protein concentrate powder) and MCC80 (micellar casein concentrate powder).

A Light base with 10% fat and 8% protein was prepared as follows:

| Cream | Skim Milk | WPC70 | MCC80 |
|---|---|---|---|
| 32.50% | 60.90% | 1.95% | 4.65% |

A Full Fat base with 22% fat and 8% protein was prepared as follows:

| Cream | Skim Milk | WPC70 | MCC80 |
|---|---|---|---|
| 65.80% | 27.20% | 2.00% | 5.00% |

The bases were pasteurized (72° C.) and homogenized (350 bar). Acidification was either performed with mesophilic cultures at 22° C. or with direct addition of a 50% citric acid solution at 5° C. The acidified bases were again heated (80° C.) and homogenized (500 bar) to produce a cream cheese.

To determine soluble calcium, the aqueous phase of the cheeses was separated with an ultracentrifuge at 65,000 g for 2 h. The partitioning of calcium and the taste perception of the cheeses is listed below.

| Sample | total Ca mg/kg | Soluble Ca mg/kg | soluble Ca (% of total) | total citrate [g/l] | pH-value | sensory perception |
|---|---|---|---|---|---|---|
| Light mesophilic | 2180 | 1856 | 85.1 | 0.4 | 4.8 | dairy sour. cultured, very bitter |
| Light citric acid | 2180 | 202 | 9.3 | 10.6 | 4.9 | very mild, bland, not bitter |
| Full Fat mesophilic | 2150 | 1743 | 81.1 | 0.3 | 5.1 | dairy sour-cultured, bitter |
| Full Fat citric acid | 2150 | 83 | 3.9 | 10.5 | 5.0 | bland, not bitter |

The table clearly shows that during mesophilic fermentation, more than 80% of the micellar calcium is solubilized and the natural citrate of milk (ca. 2.0 g/l) is mainly consumed by the bacteria. The cheeses showed an aromatic, dairy sour, cultured note, but also an unpleasant bitter off-taste.

In contrast, after acidification with citric acid, less than 10% of the total calcium was found in the centrifugal supernatant and the taste was described as mild, bland and not bitter at all.

These surprising results lead to the assumption that fresh cheeses with sufficient aromatic, dairy cultured notes, but without bitter off-taste, could be produced without the separation of acid whey by combining mesophilic fermentation with direct citric acid addition.

Example 2

Light cream cheese bases were produced from cream (30% fat), a liquid skim milk MF-concentrate (8.7% protein) and MCC80 (micellar casein concentrate powder). Additionally salt and locust bean gum (LBG) were added.

A Light base with 10% fat and 8% protein was prepared as follows:

| Cream | MF-Concentrate | MCC80 | LBG | Salt |
|---|---|---|---|---|
| 33.0% | 64.2% | 2.0% | 0.20% | 0.6% |

Comparative Method:

The base was pasteurized (90° C.) and homogenized (250 bar). Acidification was either performed with mesophilic cultures at 22° C. or with direct addition of a 50% citric acid solution at 5° C. The acidified bases were re-heated (80° C.) and homogenized (500 bar) to produce a cream cheese.

Split-Stream Acidification According to the Method Disclosed Herein:

The total base was split into a cream stream (only cream with 30% fat) and a protein stream prior to acidification.

Protein Base:

| MF-Concentrate | MCC80 | LBG | Salt |
|---|---|---|---|
| 96.0% | 2.8% | 0.30% | 0.9% |

The protein base was pasteurized (90° C.) and homogenized (250 bar) prior to acidification.

Option 1 (split 1): Cream was directly acidified with 50% citric acid solution at 5° C. and protein base was fermented with mesophilic cultures at 22° C.

Option 2 (split 2): Protein base was directly acidified with 50% citric acid solution at 5° C. and cream was fermented with mesophilic cultures at 22° C. This approach is in accordance with the method disclosed herein.

After acidification the two streams were blended, re-heated (80° C.) and homogenized (500 bar) to produce a cream cheese.

To determine soluble calcium, the aqueous phase of the cheeses was separated with an ultracentrifuge at 65,000 g for 2 h. The partitioning of calcium and the taste perception of the cheeses is listed below.

| Sample | total Ca mg/kg | soluble Ca mg/kg | soluble Ca (% of total) | total citrate [g/l] | pH-value | sensory perception |
|---|---|---|---|---|---|---|
| mesophilic | 2600 | 2600 | 100 | 0.3 | 4.8 | bitter, acidic, cultured |
| citric acid | 2600 | 380 | 15 | 9.5 | 4.9 | very mild, bland, not bitter |
| Split 1 | 2800 | 2800 | 100 | 1.4 | 4.9 | slightly bitter, sour |
| Split 2 | 2600 | 830 | 32 | 6.9 | 4.9 | balanced, mildly acidic, creamy, not bitter |

The best taste profile was obtained by sample Split 2, i.e. by mixing a directly acidified protein base with fermented cream (sour cream). This sample showed a balanced, creamy and mildly acidic taste profile without any bitter off-notes.

Example 3

Split Stream Acidification According to the Invention:

A dairy base for a full fat cream cheese was prepared with two ingredients only, i.e. a cream with 40% fat and a skim milk microfiltration (MF) concentrate with 8.7% total protein. The formula of this dairy base with the main components is listed below.

|  | Cream | Skim Milk MF-Concentrate | Dairy Base |
|---|---|---|---|
| Total Solids | 45.30% | 14.80% | 30.05% |
| Fat | 40.00% | 0.18% | 20.09% |
| Protein | 2.00% | 8.70% | 5.35% |
| Lactose | 3.00% | 4.10% | 3.55% |
| Casein | 1.60% | 7.60% | 4.60% |
| Whey Protein | 0.40% | 0.80% | 0.60% |
| Calcium | 0.08% | 0.32% | 0.20% |
| Amount % | 50.00% | 50.00% | 100.00% |

The two dairy streams were initially treated separately. The cream was heated to 83° C. for 120 seconds and then homogenized at a pressure of 50 bar. The MF-concentrate was heated to 83° C. for 120 seconds without a homogenization step. Acidification of the cream stream was always carried out by mesophilic fermentation at 21° C. until a pH of below 4.6 was reached. The protein concentrate however, was acidified in different ways:

Direct acidification with citric acid (50% solution) at 5° C. to pH values ranging from 4.6 to 5.0.

Adjustment of pH 5.9 with citric acid at 5° C. followed by thermophilic fermentation at 42° C. until a final pH below 4.6 was obtained.

Adjustment of pH 5.6 with citric acid at 5° C. followed by thermophilic fermentation at 42° C. until a final pH below 4.6 was obtained.

The cream and protein streams were cooled to 5° C. after acidification and stored overnight. The next day, 50% of sour cream and 50% of acidified protein concentrate were blended to provide the dairy bases. As additional ingredient, 0.7% salt was added.

The blends were heated to 70° C. and homogenized two-stage at 300/50 bar. The homogenized blends were re-heated to 80° C. and held at this temperature under slow stirring until sufficient texture was built up. At this stage, the hot cream cheeses were filled into plastic tubs and cooled to 5° C.

A sensory evaluation by an expert team revealed that none of the cream cheese prototypes showed any bitter or mineralic off-notes. The overall taste was described as creamy-buttery, with a distinct fermented, sour cream note. Minor differences between the prototypes were observed regarding overall sourness, firmness and smoothness in mouth. The samples produced with thermophilic cultures exhibited a slightly more sour, yoghurt-like flavor note.

Example 4

Four full fat cream cheeses were produced in pilot-scale batches of approximately 80 kg of finished product.

One batch (STD-2) was made as a reference by a conventional process, i.e. fermentation of a fat-adjusted milk first, followed by an acidic concentration step with a centrifugal separator. This step resulted in the generation of about 40 kg of acid whey per 60 kg of curd.

The other three batches were produced according to the invention.

Cream with 40% fat was fermented separately with mesophilic bacteria until a pH of 4.3-4.4. was achieved in order to generate a crème fraiche/sour cream type of intermediate product.

A milk protein concentrate with about 9-10% total protein was produced from pasteurized skim milk using microfiltration. This protein concentrate was adjusted to pH 4.9 with a 50% citric acid solution that was added at 8-10° C. under vigorous stirring to avoid flocculation.

The sour cream and acidified milk protein concentrate were blended and further processed in the same way as the reference product. The post-curd processing comprised the following steps:

Optional addition of whey-derived ingredients, e.g. whey protein concentrate (FWPC) and/or whey permeate concentrates (PC) (the addition of optional ingredients is reflected in the coding of the prototypes in the following table)

Addition of salt and locust bean gum

Pasteurization at 75° C. and homogenization at 300 bar

Texture building step

Hot filling

The composition of each of the four samples is shown in the table below, where:

FF/STD (STD-2) is the reference sample produced via the conventional process,

FF/SPLIT (SPLIT-2) was produced according to the invention without any additional whey ingredients, SPLIT-PC (SPLIT-PC-1) was produced according to the invention including added whey permeate concentrates, and SPLIT-FWPC (SPLIT-PC-FWPC-2) was produced according to the invention including added whey protein concentrate.

| Sample code | Total Solids (%) | Protein (%) | Fat (%) | Salt (%) | Lactose (%) | Calcium (mg/kg) |
|---|---|---|---|---|---|---|
| FF/STD | 32.3 | 5.4 | 20.4 | 0.8 | 4.1 | 1160 |
| FF/SPLIT | 32.0 | 5.7 | 21.5 | 0.8 | 3.0 | 1700 |
| SPLIT-PC | 34.1 | 5.8 | 21.8 | 0.8 | 4.3 | 1810 |
| SPLIT-PC-FWPC | 33.8 | 5.7 | 21.3 | 0.9 | 4.3 | 1630 |

| Sample code | Ratio soluble Ca/total Ca (%) | Citric Acid (%) | Lactic Acid (%) | pH | Firmness [g] |
|---|---|---|---|---|---|
| FF/STD | 71.2 | 0.12 | 0.49 | 4.92 | 113 |
| FF/SPLIT | 31.6 | 0.43 | 0.22 | 4.93 | 100 |
| SPLIT-PC | 28.8 | 0.46 | 0.26 | 4.97 | 90 |
| SPLIT-PC-FWPC | 30.9 | 0.43 | 0.29 | 4.88 | 105 |

It is clearly shown that the inventive products are considerably higher in total calcium, but lower in the ratio of soluble calcium to total calcium compared to the reference. In addition, the concentration of lactic acid is reduced and the concentration of citric acid is about 4 times increased.

All samples were evaluated after a minimum of 2 weeks of cold storage by a trained sensory panel.

Figure 4:
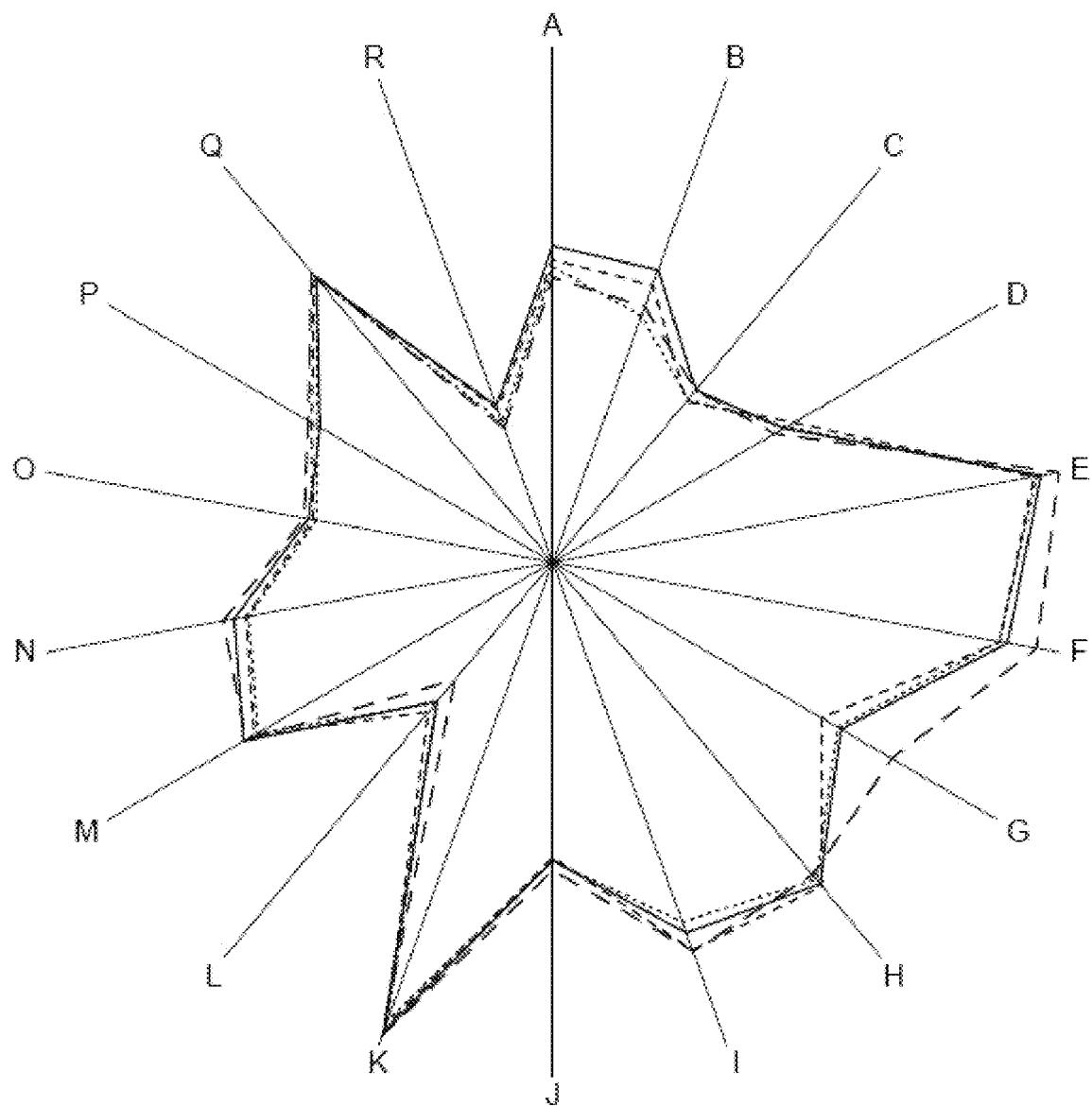
FIG. 4 shows a spider web diagram showing the sensorial profiles of the aroma (AR), flavour (FL), and aftertaste (AT) of the samples of Example 4.
Figure 5:
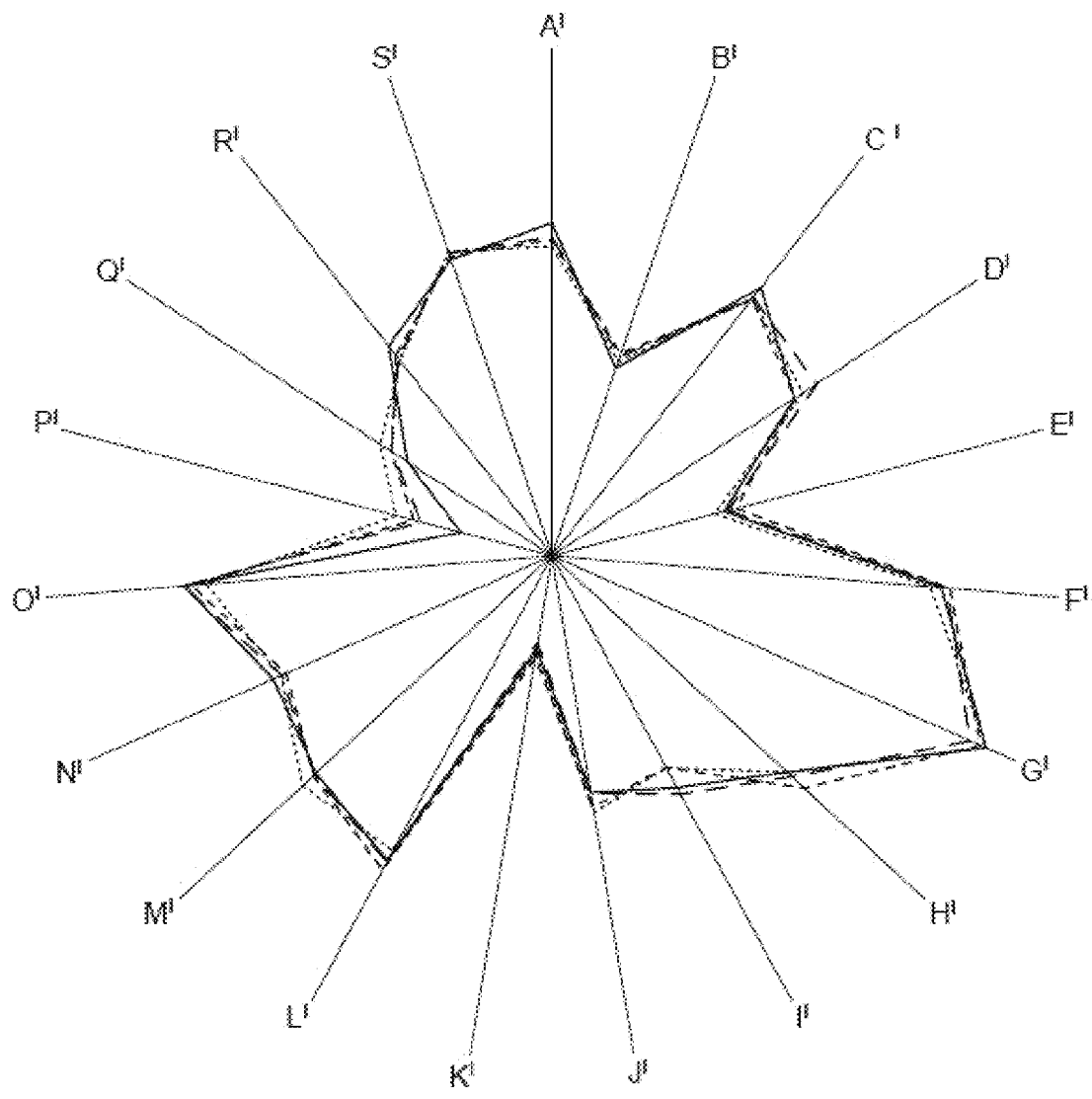
FIG. 5 shows a spider web diagram showing the sensorial profiles of the Appearance (AP), texture by hand (TH), texture in mouth (TM) and aftersensation (AS) of the samples of Example 4.

The sensory attributes are shown in FIGS. 4 and 5.

The sensorial parameters shown in FIG. 4 are:

| A | Total aroma |
|---|---|
| B | Dairy sour aroma |
| C | Sweet aroma |
| D | Butter aroma |
| E | Total flavour |
| F | Total sour flavour |
| G | Lemon sour flavour |
| H | Dairy sour flavour |
| I | Salty flavour |
| J | Sweet flavour |
| K | Cream/butter flavour |
| L | Bitter flavour |
| M | Total aftertaste |

-continued

| | |
|---|---|
| N | Sour aftertaste |
| O | Sweet aftertaste |
| P | Salty aftertaste |
| Q | Cream/butter aftertaste |
| R | Bitter aftertaste |

The sensorial parameters shown in FIG. 5 are:

| | |
|---|---|
| A' | Yellow appearance |
| B' | Rough surface appearance |
| C' | Shiny appearance |
| D' | Firm texture by hand |
| E' | Rough texture by hand |
| F' | Sticky texture by hand |
| G' | Spreadable texture by hand |
| H' | Moist texture by mouth |
| I' | Firm texture by mouth |
| J' | Creamy texture by mouth |
| K' | Light texture by mouth |
| L' | Sticky texture by mouth |
| M' | Meltable texture by mouth |
| N' | Astringent texture by mouth |
| O' | Fatty texture by mouth |
| P' | Mealy texture by mouth |
| Q' | Dull texture by mouth |
| R' | Fatty aftersensation |
| S' | Dry aftersensation |

The sensorial profiles of all tested prototypes are very close to the tested reference regarding aroma, flavour and aftertaste. Differences were observed in dairy sour aroma, total sour and lemon sour flavour. Bitterness was rated equal in all samples.

All tested prototypes are very close to tested reference regarding appearance, texture and mouthfeel.

All tested prototypes were perceived slightly higher in mealiness. Additionally there is some variability in rough texture by hand.

Accordingly, the samples produced by the present method are comparable in aroma, flavour, aftertaste, appearance, texture and mouthfeel with respect to conventional cream cheese without requiring a whey separation step.

All percentages herein are by weight unless otherwise stated.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A method for the manufacture of a cream cheese, the method comprising:
 (i) providing a first dairy liquid, wherein the first dairy liquid comprises cream;
 (ii) fermenting the first dairy liquid to form a first acidified dairy liquid by a lactic acid fermentation with lactic acid producing bacteria;
 (iii) providing a second dairy liquid, wherein the second dairy liquid comprises microfiltered or ultrafiltered milk concentrate, and wherein the second dairy liquid comprises at least 6 wt % protein;
 (iv) acidifying the second dairy liquid with citric acid to form a second acidified dairy liquid having a pH of less than 5.3; and
 (v) combining the first acidified dairy liquid and the second acidified dairy liquid to form a cream cheese, wherein a genus of the lactic-acid producing bacteria is *Lactococcus*, *Leuconostoc*, *Streptococcus*, or *Lactobacillus*.

2. The method of claim 1, wherein the cream cheese has less than 50% soluble calcium as a percentage of a total calcium content.

3. The method of claim 1, wherein the first dairy liquid consists of cream.

4. The method of claim 1, wherein the first dairy liquid is pasteurized and/or homogenized prior to step (ii).

5. The method of claim 1, wherein in step (ii) the first dairy liquid is fermented with mesophilic lactic bacteria.

6. The method of claim 1, wherein the second dairy liquid comprises from 6 wt. % to 18 wt. % protein.

7. The method of claim 1, wherein step (iv) further comprises fermenting the second dairy liquid either before or after the acidification with citric acid.

8. The method of claim 7, wherein the step of fermenting the second dairy liquid occurs after acidification with citric acid and comprises fermenting the second acidified dairy liquid with citrate negative bacteria.

9. The method of claim 1, wherein after step (ii) the first acidified dairy liquid has a pH of less than 5.5; and/or
 wherein after step (iv) the second acidified dairy liquid has a pH of between 4.5 and 5.0.

10. The method of claim 1, wherein the second dairy liquid is produced by a method comprising:
 (a) providing a third dairy liquid comprising milk;
 (b) pasteurizing the third dairy liquid;
 (c) ultrafiltrating or microfiltrating the pasteurized third dairy liquid; and, optionally,
 (d) heat-treating the filtered pasteurized third dairy liquid.

11. The method of claim 1, wherein the first and second dairy liquids provide at least 90 wt % of the acidified mixture, and are present in a ratio by weight of from 1:4 to 4:1.

12. The method of claim 1, wherein step (iii) and/or step (v) further comprises adding one or more of whey protein concentrate and lactose concentrate, a further protein source, lactose, salt, locust bean gum, carrageenan, gelatin, citrate, stabilizers, colors and flavors.

13. The method of claim 1, wherein step (v) comprises heat treating and/or homogenizing and/or texturizing the combined first and second acidified dairy liquids.

14. The method of claim 13, wherein the step of texturizing the combined first and second acidified dairy liquids is carried out for a period of 10-80 minutes, and/or wherein the step of texturizing the combined first and second acidified dairy liquids is carried out at a temperature of 70-90° C.

15. The method of claim 2, wherein the total calcium content of the cream cheese is at least 1600 mg/kg.

16. The method of claim 2, wherein the cream cheese has less than 40% soluble calcium as a percentage of a total calcium content.

17. The method of claim 5, wherein in step (ii) the first dairy liquid is fermented with citrate positive mesophilic lactic bacteria.

18. The method of claim 8, wherein the step of fermenting the second dairy liquid comprises fermenting the second acidified dairy liquid with citrate negative thermophilic or mesophillic lactic bacteria.

19. The method of claim 9, wherein after step (ii) the first acidified dairy liquid has a pH of between 3.75 and 5.3.

* * * * *